(12) United States Patent  (10) Patent No.: US 7,414,220 B2
Oyster et al.  (45) Date of Patent: Aug. 19, 2008

(54) ORBITAL WELD HEAD

(75) Inventors: Peter Oyster, Stow, OH (US); Nathan Ames, Streetsboro, OH (US); Craig Mizer, Stow, OH (US); Tom Horvath, Cleveland Heights, OH (US)

(73) Assignee: Swagelok Company, Solon, OH (US)

( * ) Notice: Subject to any disclaimer, the term of this patent is extended or adjusted under 35 U.S.C. 154(b) by 562 days.

(21) Appl. No.: 10/912,316

(22) Filed: Aug. 5, 2004

(65) Prior Publication Data

US 2005/0045596 A1  Mar. 3, 2005

Related U.S. Application Data

(60) Provisional application No. 60/481,216, filed on Aug. 12, 2003.

(51) Int. Cl.
*B23K 9/12* (2006.01)

(52) U.S. Cl. .................. 219/60 A; 219/125.11
(58) Field of Classification Search .............. 219/60 A, 219/125.11
See application file for complete search history.

(56) References Cited

U.S. PATENT DOCUMENTS

| | | | |
|---|---|---|---|
| 3,870,849 A | 3/1975 | Rygiol | |
| 4,379,215 A * | 4/1983 | Rohrberg | 219/60 A |
| 4,417,129 A | 11/1983 | Young | |
| 4,841,115 A | 6/1989 | Severin et al. | |
| 4,857,690 A * | 8/1989 | Kazlauskas | 219/60 A |
| 4,973,823 A | 11/1990 | Benway et al. | |
| 5,136,134 A | 8/1992 | Benway et al. | |
| 5,220,144 A | 6/1993 | Jusionis | |
| 5,223,686 A * | 6/1993 | Benway et al. | 219/60 A |
| 5,571,431 A | 11/1996 | Lantieri et al. | |
| 5,710,403 A | 1/1998 | Jusionis | |
| 5,841,089 A | 11/1998 | Martinenas | |
| 5,844,190 A | 12/1998 | Benway et al. | |
| 6,380,505 B1 | 4/2002 | Stoops et al. | |
| 6,459,062 B1 | 10/2002 | Guerrina | |
| 7,026,568 B2 * | 4/2006 | Guerrina | 219/60 A |
| 2003/0111444 A1 | 6/2003 | Guerrina | |

FOREIGN PATENT DOCUMENTS

DE  100 06 712 A1 *  8/2001

OTHER PUBLICATIONS

Cogebi, Mica Plates for high-performance thermal and electrical insulation, Cogebi, 1999.*
Partial International Search Report from PCT/US04/025763.
Creative Pathways Incorporated, The New Generation in Orbital Welding Systems, May 1984, USA.
Swagelok Company, Series 4 and Series 8 Micro Weld Heads, Orbital Welding System, Oct. 2001, p. 1-5, USA.
Arc Machines, Inc., Model 4 Bench-Top Weld Heads, Jun. 2004.

* cited by examiner

*Primary Examiner*—Kevin P. Kerns
(74) *Attorney, Agent, or Firm*—Calfee Halter & Griswold, LLP

(57) ABSTRACT

An orbital weld head includes a metal insert and rotor. The covers are made from mica laminate. A metal spring/brush that is preferably one piece side loads the rotor against the insert. The rotor and insert have interengaging portions, preferably trapezoidal, that cause the rotor to move axially when it expands from heat, thus minimizing binding.

47 Claims, 8 Drawing Sheets

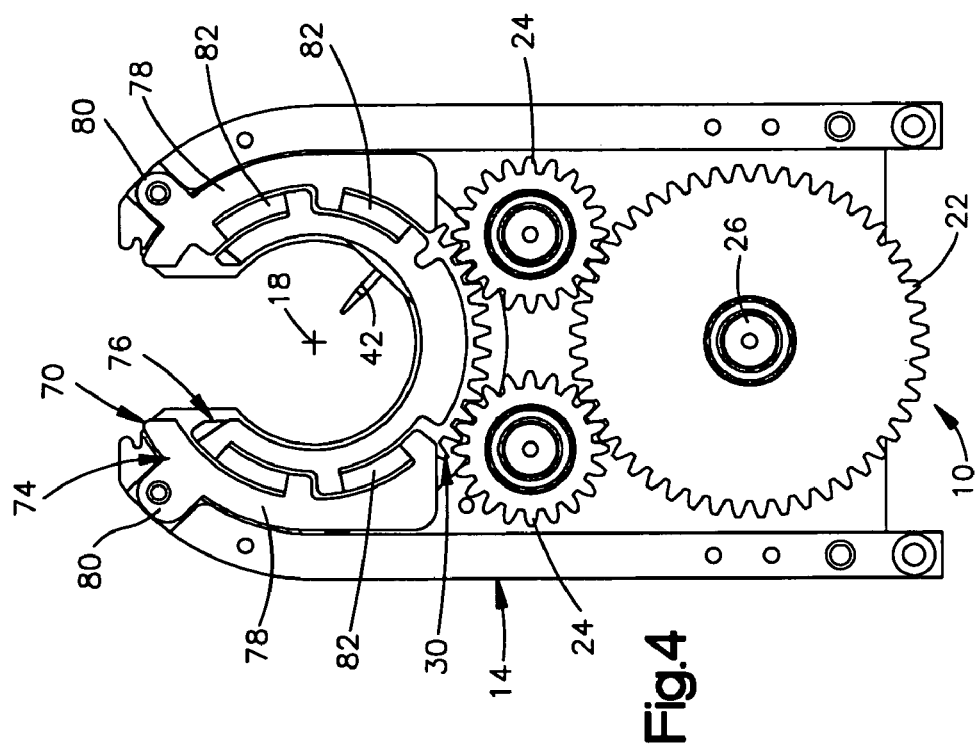
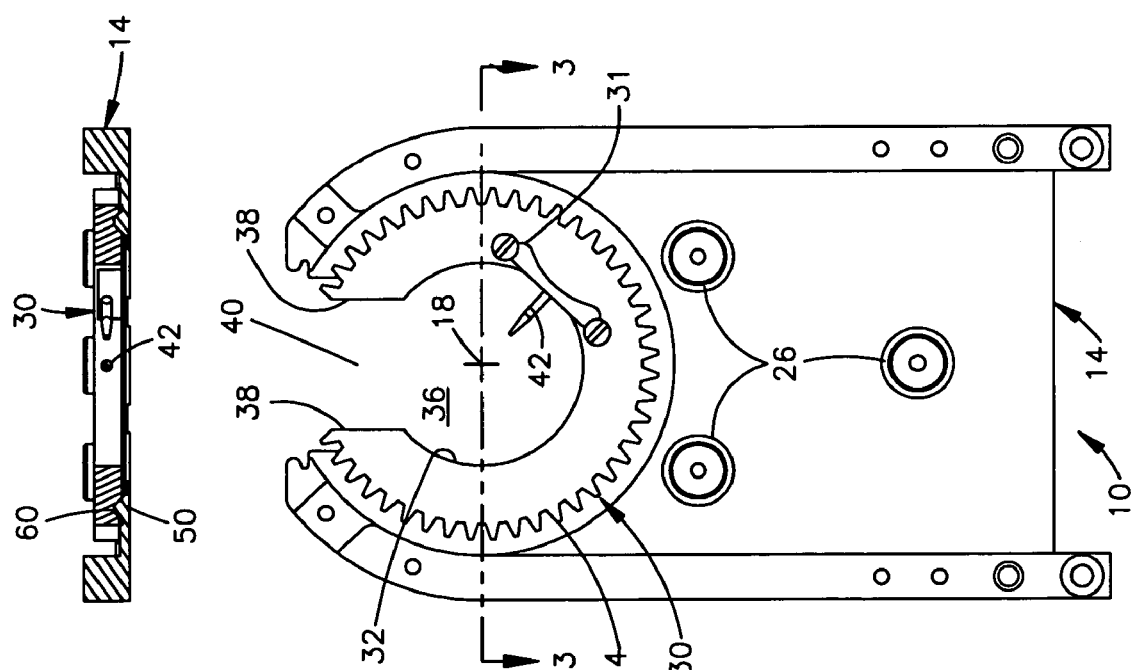

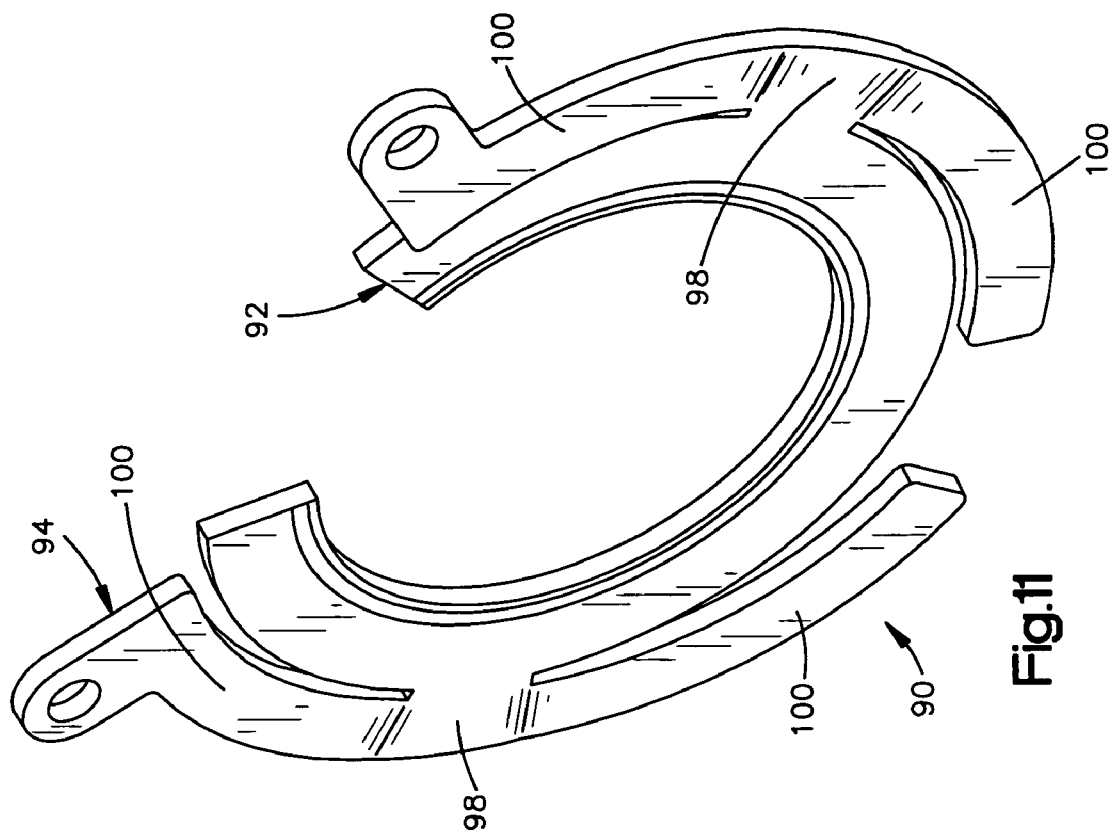
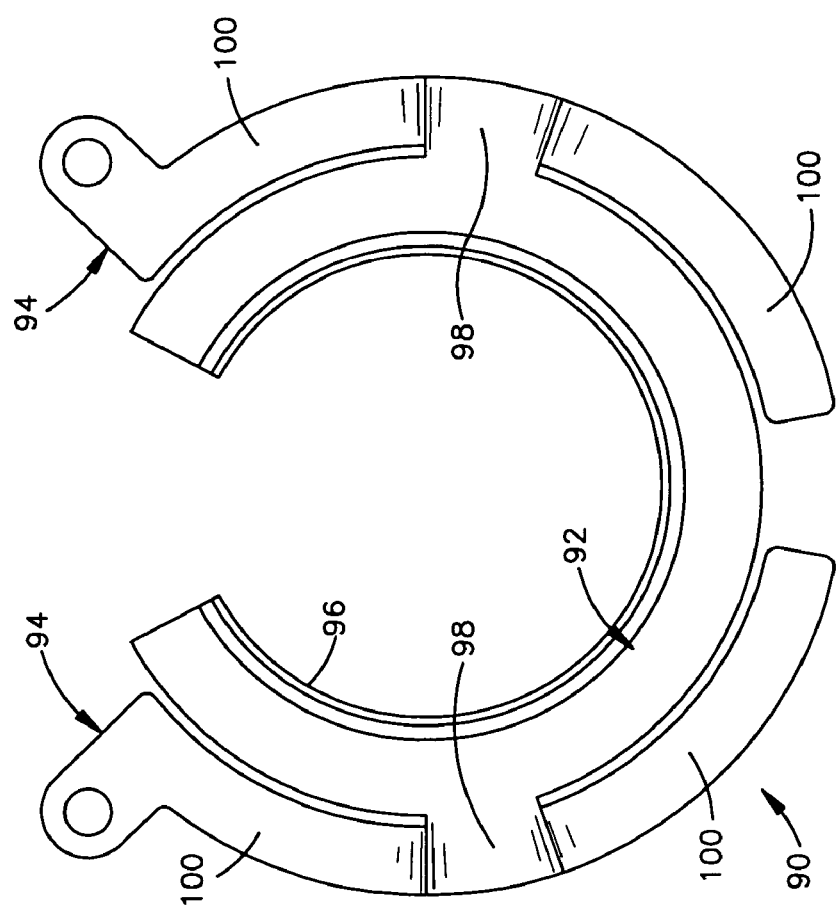

ORBITAL WELD HEAD

RELATED APPLICATION

This application claims the benefit of the filing date of U.S. Provisional Application No. 60/481,216 filed Aug. 12, 2003, the entire disclosure of which is incorporated by reference.

BACKGROUND OF THE INVENTION

Orbital welding involves the use of a weld head that retains an electrode that revolves (orbits) around a workpiece as it welds the workpiece. The workpiece may be, for example, two cylindrical tubes having abutting end portions to be welded together end to end.

A known orbital welder includes a weld head that has two jaws defining an opening between the jaws. The weld head is placed in a welding position relative to the workpiece by moving the workpiece through the opening between the jaws. The workpiece is then in a circular work space inside a rotor. The rotor carries an electrode. When the weld head is actuated, the rotor rotates about the workpiece, and the electrode orbits about the workpiece. An electric arc is produced between the electrode and the workpiece. The heat of the arc welds the joint on the workpiece. Representative patents showing this general type of welder are U.S. Pat. Nos. 4,379,215 and 5,844,190, the entire disclosures of which are incorporated herein by reference.

The arc welding process produces a substantial amount of heat. Many known orbital welders have no internal cooling system and utilize plastic components that do not dissipate the heat well. This can degrade any plastic components of the weld head and thereby limit the number of workpieces the known weld head can weld before the weld head must be allowed to cool. Other known orbital welders have a water cooling system or other forced cooling system.

Heat generated during the welding process can also cause expansion of parts of the known weld head. For example, one portion of the known weld head includes a circular groove with a rectangular cross-sectional configuration. The rotor has a circular boss with a complementary rectangular cross-sectional configuration. The boss on the rotor is received in the groove. The slip fit engagement of the boss in the groove controls and guides movement of the rotor. As the parts of the known weld head heat up and expand, the rotor boss can bind on the portion of the known weld head that includes the groove.

One way to avoid binding is to add more clearance between the rotor and the insert; this produces, however, an electrode that does not orbit with a consistent arc gap.

SUMMARY OF THE INVENTION

The present invention provides a rotor and insert configuration that produces a consistent arc gap and no binding without the need for the additional clearance. Thus, the present weld head design allows for the inevitable expansion that comes with use, without having to provide extra clearance in the system to accommodate that expansion. As a result, more accurate and consistent welds can be obtained over a longer period of time before overheating becomes a problem.

The present invention relates to several other advantageous features for an orbital weld head. One feature is the use of a mica laminate as the cover for the weld head, for thermal and electrical insulation. Another feature is an all metal insert with a metal brush/spring and electrode all at the same potential. In the embodiments illustrated a combination of more than one of these features is illustrated. It should be understood that any one or combination of these features can be employed in an orbital weld head and be considered to be within the scope of the invention.

BRIEF DESCRIPTION OF THE DRAWINGS

FIG. 2 is a plan view of a metal insert and rotor that form part of the weld head of FIG. 1;

FIG. 3 is a sectional view taken generally along the line 3-3 of FIG. 2;

FIG. 4 is a plan view similar to FIG. 2 with other parts of the weld head added;

FIG. 10 is a plan view of a brush/spring assembly in accordance with a third embodiment of the invention;

FIG. 11 is a perspective view of the brush/spring assembly of FIG. 10;

DESCRIPTION OF THE INVENTION

Figure 1:
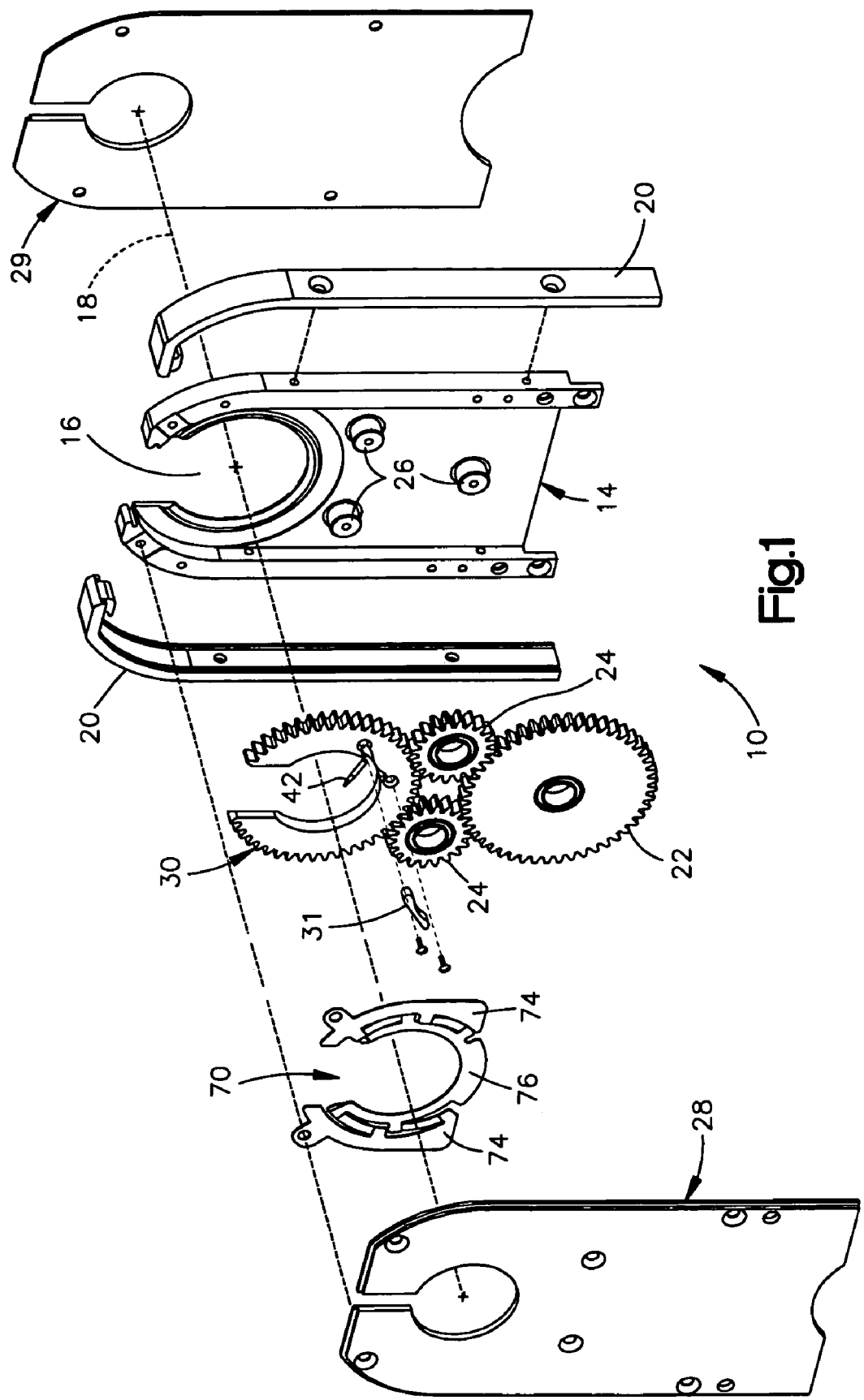
FIG. 1 is an exploded perspective view of a weld head in accordance with a first embodiment of the present invention.

The present invention relates to an orbital weld head and is applicable to weld heads of varying and different constructions. As representative of the invention, FIG. 1 illustrates a portion of an orbital weld head 10 in accordance with a first embodiment of the invention.

The weld head 10 includes an insert 14 that serves as the base of the weld head, supporting many of the other parts of the weld head. The insert 14 has a generally circular work opening 16 centered on an axis of rotation 18 (FIG. 2) of the weld head 10. Two electrically insulating edge pieces 20 are secured to the insert 14, in a manner not shown.

The insert 14 may be made from plastic but is preferably made from an electrically conductive metal, such as stainless steel, copper, or bronze. Metal typically can absorb more heat than plastic without deforming, and metal is more stable when it does absorb heat. As a result, the insert 14 if made from metal can absorb a relatively large amount of heat. This can help enable the weld head 10 to perform more welds in a given period of time.

The weld head 10 includes a drive gear 22 for receiving rotational force from a drive (not shown), such as an electric motor drive. The drive gear 22 meshes with two idler gears 24. The drive gear 22 and the idler gears 24 are supported on bosses 26 on the insert 14. The gears 22 and 24 are preferably made from metal.

The weld head 10 includes first and second covers 28 and 29 secured to the insert 14. The covers 28 and 29 are made from a heat-resistant, electrically insulating material. One suitable material is a high temperature plastic, or a phenolic material. Another suitable material is a mica laminate.

The preferred material for the covers 28 and 29 is a mica laminate sold under the brand name COGETHERM® M. The material is manufactured by Cogebi-Huysmanslaan, 65, B-1651 Lot Belgium, with facilities in the US at Cogebi, Inc. Crosby Road Industrial Park, 14 Faraday Drive, Dover N.H. 03820. This material is available from several vendors. One is Curbell Industrial Plastics, 23103 Miles Road, Cleveland, Ohio 44128.

The composition of COGETHERM™ M is ±90% Cogemica Muscovite, ±10% bonding material. An alternative material is COGETHERM™ P. The composition of COGETHERM™ P is ±90% Cogemica-Phlogopite Muscovite, ±10% bonding material.

Chemically, mica is an alumino-silicate composition. Two main classes exist: Muscovite, when Potassium predominates, or Phlogopite, when Magnesium is present. Mica ore possesses a specific property: it can be cleaved to give very thin lamellae (sheets or layers) of constant thickness. The preferred mica material is a laminate including several sheets.

This material is preferred because it holds up to the intense heat produced from welding at the desired increased weld rate. The preferred material is rated at a continuous use temperature of 1300° F. for bonded Cogemica-Phlogopite (COGETHERM™ P) and 932° for bonded Cogemica Muscovite (COGETHERM™ M). The material also holds up to the intense exposure to the welding arc at a close proximity. It does not deform or melt under the above conditions, as some plastics might.

The mica laminate has been found in tests to hold up better than any of the known plastics used in this application. As a result, this material when used as a cover for an orbital weld head may help the weld head to perform more welds in a given period of time. The mica laminate material does not deform or otherwise become unusable under the high heat conditions experienced in sustained operation of the weld head 10.

This mica laminate material is known for use as a replacement for asbestos and for other insulating boards for a variety of applications. It is used in high voltage appliances thanks to its dielectric qualities and its resistance to electric arc and erosion. In the construction of induction and arc furnaces, mica laminate (such as COGETHERM™ M and COGETHERM™ P) is used for its thermal and electric insulation properties, as well as its permeability to high-frequency waves. In the field of induction heated equipment for brazing aluminum and copper discs to cooking utensils, COGETHERM™ is a replacement for asbestos-cement plates.

From the known characteristics of mica laminates, it could be perceived that delaminating is an issue (low shear strength). This has not, however, been found to be the case when the material is used in sheet form in this application.

The preferred mica laminate material is machined from plates or sheet stock. It comes in various thicknesses. The closest stock thickness would be chosen and then machined (milled) to the appropriate thickness.

The weld head 10 further includes a rotor 30. The rotor 30 is an electrically conductive, metallic member supported on the insert 14, in a manner described below, for rotation about the axis 18 relative to the insert to move an electrode about the axis. The rotor 30 has an annular, C-shaped configuration including circular inner and outer peripheries 32 and 34 (see FIG. 2). The inner periphery 32 of the rotor 30 defines a work space 36 of the weld head 10, in which a workpiece can be placed for welding of the workpiece.

The rotor 30 has two ends 38 spaced apart to form an insertion opening 40 to enable movement of the workpiece into the work space 36 of the rotor. The outer periphery 34 of the rotor 30 is formed as an external gear. The external gear on the rotor 30 meshes with the idler gears 24 to receive rotational force from the drive. As a result, the rotor 30 rotates when rotational force is applied to the drive gear 22.

An electrode 42 is fixed to the rotor 30 for movement with the rotor. The electrode 42 extends radially inward from the inner periphery 32 of the rotor 30, into the work space 36. The electrode 42 is electrically conductive with, and at the same electric potential as, the rotor 30. As the rotor 30 rotates around a workpiece, the electrode 42 is carried around the workpiece to effect welding of the workpiece, in a manner known in the art.

The rotor 30 has an insulator 31 (FIGS. 1 and 3), which is preferably made from a ceramic material. The insulator 31 helps to prevent skin effect arcing between the electrode 42 and the rotor 30. The rotor may also have notches (not shown) for receiving argon gas to aid in the welding process, as is known.

The insert 14 has an inner major side surface 44 (FIG. 5) facing the rotor 30. The insert 14 includes a boss 50 on its inner major side surface 44. The boss 50 is a portion of the rotor 30 that helps to position and guide the rotor on the insert 14 for rotation about the axis 18. The boss 50 has a circular, C-shaped configuration when viewed in a direction along the axis 18, as in FIG. 2.

The configuration of the boss 50 is selected to maximize operability of the weld head in repeated use. The boss 50 could have different configurations in accordance with the present invention. A first embodiment is shown in FIGS. 1-5. Alternative embodiments are shown in FIGS. 7 and 16-19, and are discussed below.

Figure 5:
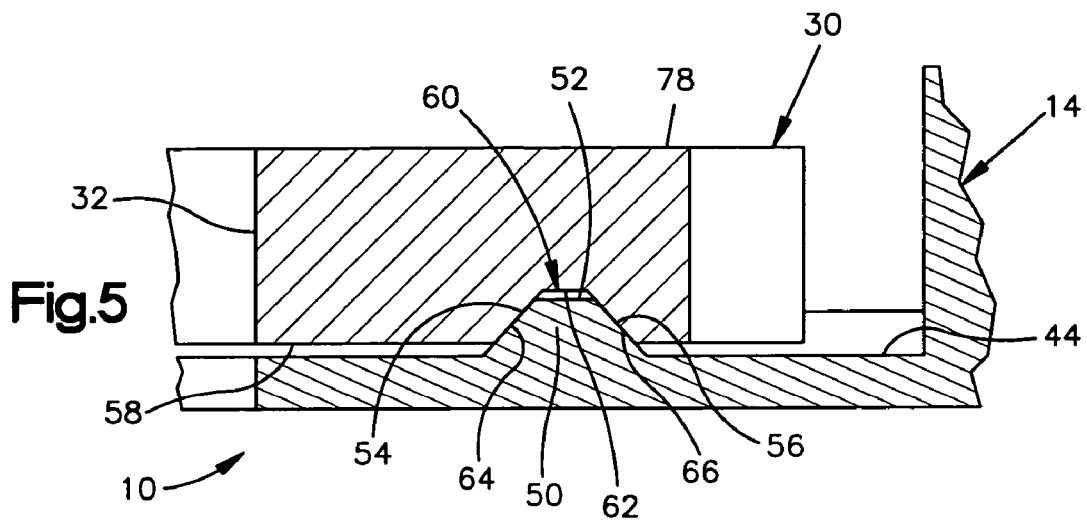
FIG. 5 is an enlarged sectional view of a portion of the weld head of FIG. 3, showing the parts of the weld head in an unexpanded condition.
Figure 6:
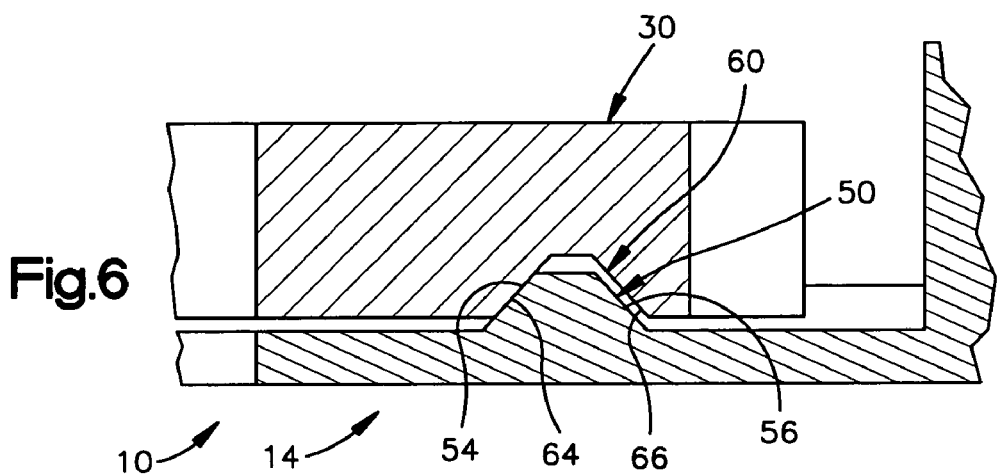
FIG. 6 is a view similar to FIG. 5, showing the parts of the weld head in an expanded condition.

The boss 50 in the embodiment illustrated in FIGS. 1-5 has a trapezoidal configuration (when viewed in cross-section, as in FIG. 6). The trapezoidal configuration includes a planar end surface 52 that extends parallel to the inner major side surface 44 of the insert 14. The trapezoidal configuration also includes inner and outer side surfaces 54 and 56 that extend obliquely between the end surface 52 and the inner major side surface 44 of the insert 14.

In the illustrated embodiment, the side surfaces 54 and 56 extends at about a forty-five degree angle to the end surface 52 and to the inner major side surface 44. In other embodiments, this angle could be different from forty-five degrees.

The rotor 30 has a major side surface 58 (FIG. 5) facing the inner major side surface 44 of the insert 14. The rotor 30 includes a groove or track 60 on its major side surface 58. The track 60 is a portion of the insert 14 and thus a portion of the weld head 10 that helps to position and guide the rotor 30 for rotation about the workpiece opening of the weld head. The track 60 has a circular, C-shaped configuration that is the same as the C-shaped configuration of the boss 50 on the insert 14.

In the embodiment illustrated in FIGS. 1-5, the track 60 has a trapezoidal configuration (when viewed in cross-section, as in FIG. 5). The track 60 is defined by a planar end surface 62 on the rotor that extends parallel to the major side surface 58 of the rotor 30. The track 60 is further defined by inner and outer side surfaces 64 and 66 that extend obliquely between the end surface 62 and the major side surface 58 of the rotor 30.

In the illustrated embodiment, the track side surfaces 64 and 66 extend at about forty-five degree angles to the end surface 62 and to the major side surface 58. In other embodiments, this angle could be different from forty-five degrees. In the illustrated embodiment, therefore, the angle of the track side surfaces 64 and 66 corresponds to the angle of the boss side surfaces 54 and 56, and the overall cross-sectional configuration of the track corresponds to the cross-sectional configuration of the boss 50 on the insert 14. In other embodiments, as described below, the angles could be different, and this correspondence is not necessary.

The length of the end surface 52 of the boss 50 is greater than the length of the end surface 62 of the groove. As a result, the outer side surfaces 54 and 56 of the boss 50 are spaced apart by a distance that is greater than the distance between the side surfaces 64 and 66 of the groove 60. Therefore, the rotor 30 with its groove 60 always rides on one or both of the side surfaces 54 and 56 of the boss 50 of the insert 14.

The inner side surface 64 of the rotor track 60 rides on the inner side surface 54 of the insert boss 50. The outer side surface 66 of the rotor track 60 rides on the outer side surface 56 of the insert boss 50. As a result, the boss 50 on the insert 14 supports the rotor 30 for rotation relative to the insert.

The engagement between the insert boss 50 and the rotor track 60 also positions the rotor 30 radially on the insert 14, so that the work space 36 of the rotor is concentric with the work opening 16 of the insert. The engagement between the insert boss 50 and the rotor track 60 thereby supports the electrode 42 for rotation in a circular path, centered on the axis 18, during welding of the workpiece.

The metal insert 14 receives welding current in a manner not shown, such as by electrical connection through openings in the edge pieces 20. As a result, the insert 14 is at full welding potential.

The abutting engagement of the metal rotor 30 on the metal insert 14 creates a path for current to flow from the insert to the rotor. As a result, the rotor 30 is also at full welding potential. So also is the electrode 42, which is fixed to the rotor 30. The metal idler gears 24 and the metal drive gear 22 are also at full potential.

The weld head 10 further includes a brush 70 (FIGS. 1, 4 and 8-9). The brush 70 urges the rotor 30 in an axial direction against the insert 14 (the rotor is thus a "side load" rotor). The brush 70 can also help to conduct electricity to the rotor 30. A weld head in accordance with the present invention can include an alternative brush design, as shown for example in FIGS. 10-15 below and described with reference to those Figures.

Figure 8:
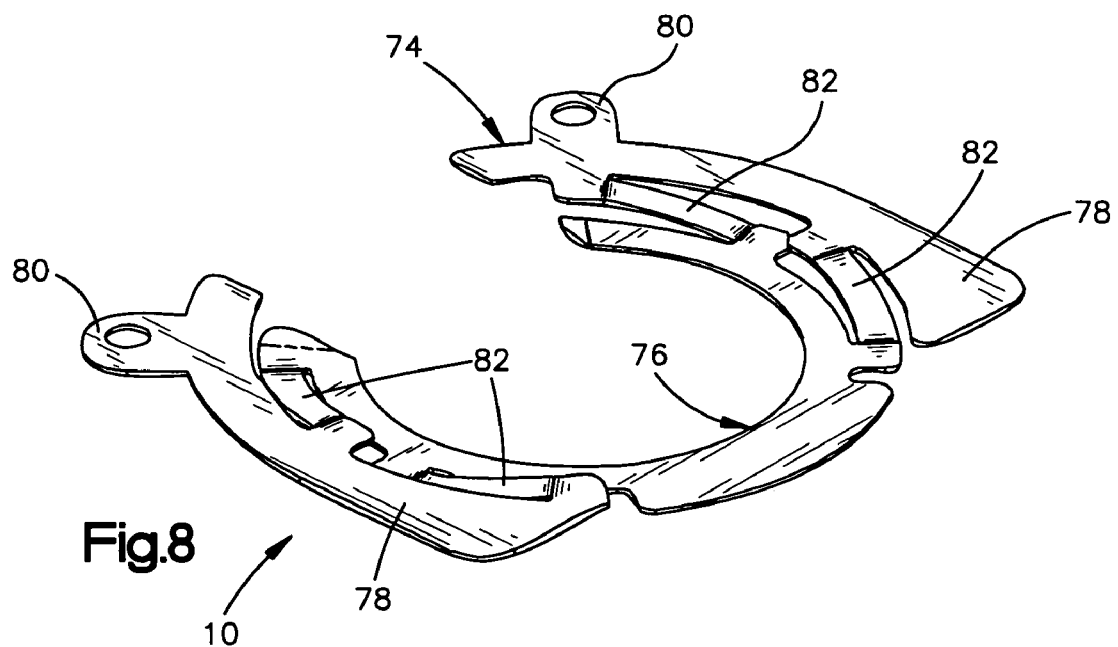
FIG. 8 is a perspective view of a brush/spring assembly that forms part of the weld head of FIG. 1.
Figure 9:
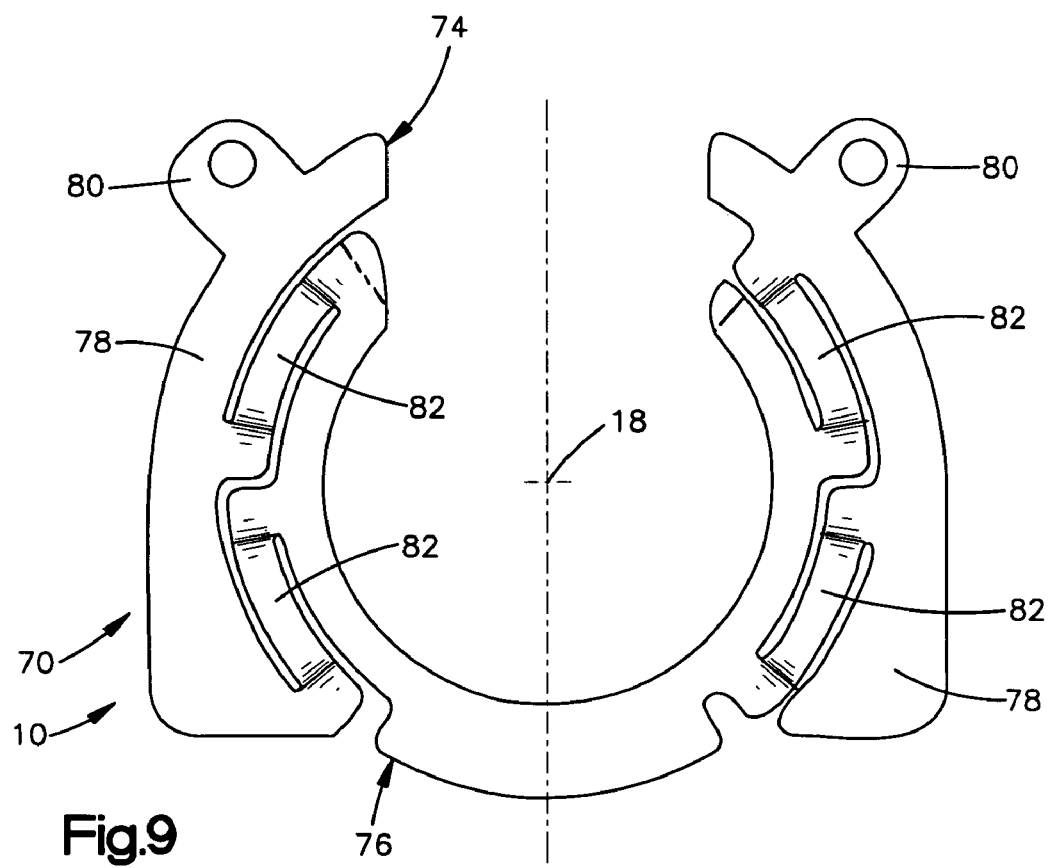
FIG. 9 is a plan view of the brush/spring assembly of FIG. 8.

The specific brush 70 that is illustrated in FIGS. 8 and 9 is a one-piece member having a generally U-shaped or C-shaped configuration when viewed in plan as in FIG. 9. The brush 70 is made from an electrically conductive metal. The C-shaped configuration is centered on the axis 18.

The brush 70 has a C-shaped outer portion 74 and a C-shaped inner portion 76. The outer portion 74 of the brush lies in one plane and includes two arms 78. The outer brush portion 74 includes two ears 80 at the ends of the arms 78 for electrical and mechanical connection of the brush 70 with the insert 14.

The inner portion 76 of the brush 70 is formed in an annular configuration that is concentric with the outer portion 74 but lies in a different plane. Four spring arms 82 extend between and interconnect the outer and inner portions 74 and 76 of the brush 70. The spring arms 82 are resilient and thus help to position the brush.

The brush 70 is assembled in the weld head 10 so that it is disposed between the rotor 30 and the first cover 28. The inner portion 76 of the brush 70 is in contact with the rotor 30. The outer portion 74 of the brush 70 is in contact with the first cover 28. The spring arms 82 of the brush 70 resiliently urge the inner portion 76 of the brush away from the first cover 28. The inner portion 76 of the brush 70 is urged into engagement with the rotor 30, and transmits the force of the spring arms 82 into the rotor.

The force of the spring arms 82, as transmitted through the rotor 30, tends to urge the rotor into firm engagement with the insert 14. Specifically, this force tends to urge the rotor track 60 into firm engagement with the insert boss 50, as shown in FIG. 6. As a result, physical contact is maintained between the rotor 30 and the insert 14, thus minimizing the possibility of arcing within the weld head 10.

The engagement of the brush 70 with the rotor 30 also provides another flow path for electric current to flow to the rotor and thence to the electrode 42. This results because the brush 70 is made from an electrically conductive material, such as copper, and is at the same electric potential as the insert 14. The brush 70 could, alternatively, be made from a non-conductive material. Were the brush 70 made from a non-conductive material, the brush would still help the rotor 30 to maintain physical and electrical contact with the insert 14. If the insert 14 were not metallic, then the brush 70 would need to be metallic to provide a current flow path for the rotor 30.

When the weld head 10 is operated, heat is generated. The parts of the weld head 10, including the insert 14 and the rotor 30, are heated and, as a result, expand. It is desirable that this expansion not cause the rotor 30 to bind on the insert 14.

The configuration of the insert boss 50 and of the rotor track 60 minimizes the possibility of binding of the rotor 30 on the insert 14. Specifically, when the parts of the weld head 10 are in an unexpanded condition as shown in FIG. 5, both the inner and outer side surfaces 64 and 66 of the rotor track 60 are in contact with the insert boss 50. If the rotor 30 thereafter expands more than the insert 14, the track 60 of the rotor moves radially outward relative to the insert boss 50, as shown in FIG. 6. Only one of the side surfaces 64 and 66 of the track 60 remains in contact with the insert boss 50—in the case shown, the side surface 64. The rotor 30 and its groove 60 also move upwardly (in a direction parallel to the axis 18) as well as laterally—in the illustrated embodiment, by the same amounts laterally and upwardly (on each side of the rotor), because of the 45 degree angle of the trapezoid.

If the insert boss 50 and the track 60 had sides with an angle other than 45 degrees, the relative amounts of vertical and horizontal movement would be different. For example, a larger angle between the inner major side surface 44 and the angled side surfaces 54 and 56 would provide greater axial movement relative to radial movement. As the angle approached 90°, however, binding would become more likely. In contrast, a smaller angle between the inner major side surface 44 and the angled surfaces 54 and 56 would provide reduced axial movement relative to radial movement. As the angle approached 0°, however, there would be an increased tendency for the track 60 to jump off the boss 50. The forty-five degree angle is presently preferred because it provides a mean, in effect, between minimizing binding and minimizing axial movement.

The upward (axial) movement of the rotor 30 is tolerated in order to accommodate the lateral movement that inevitably comes with heating and expansion. The amount of upward movement is desirably minimized, however, to avoid moving the electrode 42 too far axially relative to the workpiece. Although the 45° angle produced by a trapezoidal shape is illustrated as the preferred embodiment, it should be understood that other angles may be optimal in particular applications, depending on weld head size and other factors. The present invention is intended to encompass all such variations.

Thus, when the rotor 30 expands because of heating, the rotor does not move (or reconfigure) into a position that might cause binding of the rotor on the insert 14, but instead continues to ride freely along the insert boss 50. The trapezoidal (or triangular) track 60 of the present invention does not bind, because the rotor 30 rides up the angled side surfaces 54 and 56 of the trapezoidal or triangular boss 50.

When the rotor 30 expands, the track 60 moves radially outward, away from the axis 18. If this expansion were to cause the engagement of two surfaces that are perpendicular to the direction of expansion, the rotor 30 would not be caused to move vertically. Such expansion could, as a result, eventually cause binding between the rotor 30 and the insert 14.

By the present invention, the configuration of the track 60 and the boss 50 are selected so that the force generated by radial expansion of the rotor 30 generates, or results in, vertical movement also of the rotor. This allows for expansion of the rotor without having to provide too much initial clearance between the rotor and the insert 14.

Specifically, the engaging surfaces 64 of the rotor 30 and 54 of the boss 50 are not perpendicular to or parallel to the direction of expansion of the rotor. Therefore, the expansion of the rotor 30 and its engagement with the insert boss 50 produces both a horizontal component and a vertical component of resultant force. As a result, the rotor 30 moves (is displaced) vertically as well as horizontally. This enables the rotor 30 to move to a position in which it does not bind on the insert boss 50.

Typically the rotor 30 expands more than the insert 14 because the rotor absorbs more heat during the welding process. If the insert 14 were to expand more than the rotor 30, the relative radial positions of the boss 50 and track 60 would not be as shown in FIG. 6, but would be reversed—that is, the center of the boss 50 on the insert would be located radially outward of the center of the track 60 on the rotor. In this case, the outer side surface 56 of the insert boss 50 would be in engagement with the outer side surface 66 of the rotor track 60, establishing and maintaining electrical contact between the insert 14 and the rotor 30, without binding of the rotor on the insert.

The arc gap between the electrode 42 and the workpiece stays centered when the rotor 30 expands as thus described, even though no clearance is present between the rotor and the insert boss 50. A weld head having a rectangular track, in contrast, needs clearance (a gap) between the rotor and the insert boss to avoid binding. The presence of such a gap can mean that the rotor does not turn concentrically with the workpiece, and inaccurate electrode positioning may result.

The boss and track configurations of the present invention preferably have no designed-in clearance. Therefore, there is no "slop" or free play of the rotor, as this can provide for more accurate welding. The designed-in clearance can be eliminated because the rotor is free to move axially when it expands radially, thus accommodating expansion without binding.

Because the configuration of the boss 50 is similar to the configuration of the track 60, the boss and the track have mating surfaces that provide area contact, not merely line contact. Maximizing the surface area of contact between the rotor 30 and the insert 14, in this manner, provides better electrical contact and also minimizes wear because it reduces unit loading. It should be understood that the non-binding track feature of the present invention is applicable to a weld head that uses a plastic insert with a metal rotor.

Figure 7:
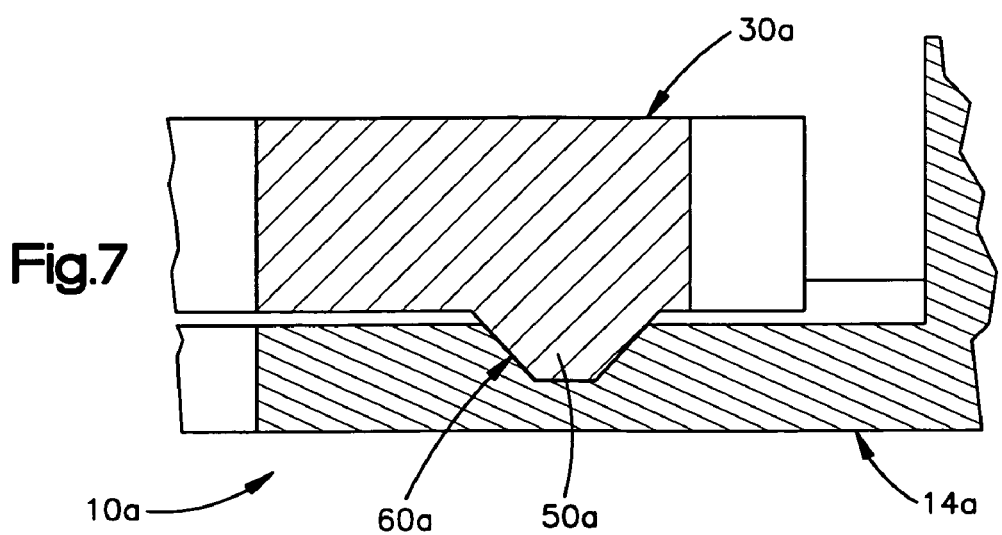
FIG. 7 is a view similar to FIG. 5 of a weld head in accordance with a second embodiment of the invention.

FIG. 7 illustrates a portion of a weld head 10a in accordance with a second embodiment of the invention. In the weld head 10a, the positions of the boss and the track are reversed. Specifically, the insert 14a has a trapezoidal groove or track 60a, while the rotor 30a has a trapezoidal boss 50a that is received in the track. The engagement of the boss 50a of the rotor 30a in the track 60a of the insert 14a positions the rotor relative to the insert. This engagement also maintains electrical contact between the rotor 30a and the insert 14a, even when the parts are heated and expand unevenly, as described above.

FIGS. 10 and 11 illustrate an alternative one-piece brush/spring or brush 90. The brush 90 is formed as one piece from an electrically conductive material, such as metal. The brush has an overall C-shaped configuration when viewed in plan as in FIG. 10.

The brush has an inner portion, or brush portion 92, and an outer portion, or spring portion 94. The inner portion 92 of the brush 90 lies in one plane. An inner peripheral edge portion of the inner portion 92 of the brush 90 may be bent upward as shown at 96 to form a rim to strengthen the inner portion.

Two radially projecting tabs 98 join the inner portion 92 with the outer portion 94. The outer portion 94 is formed as four arcuate spring arms 100 that are bent out of the plane of the inner portion 92 and that extend from the two tabs 98. The spring arms 100 are resilient and thus help to position the brush 90.

The brush 90 is usable in the weld head 10 of FIG. 1 in place of the brush 70. When the brush 90 is assembled in the weld head 10, the inner or brush portion 92 of the brush is in contact with the rotor 30. The spring portion 94 of the brush 90, i.e., the group of spring arms 100, is in contact with the first cover 28. The brush 90 helps to position the rotor 30 axially as described above, urges it into contact with the insert 14, and also provides a flow path for electricity to the rotor.

Figure 12:
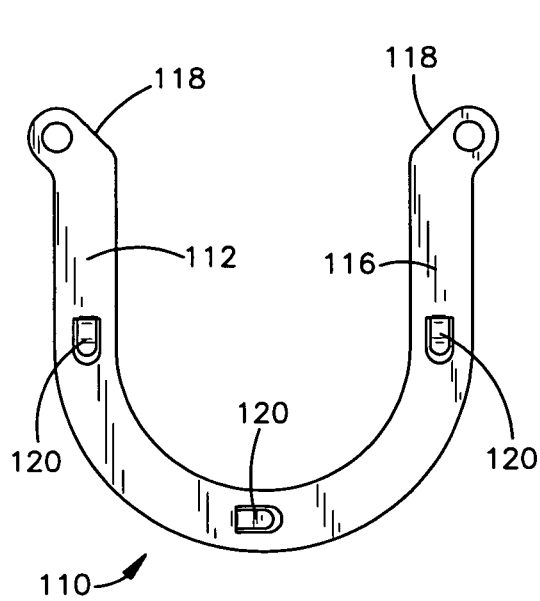
FIG. 12 is a plan view of a brush/spring assembly in accordance with a fourth embodiment of the invention.
Figure 13:
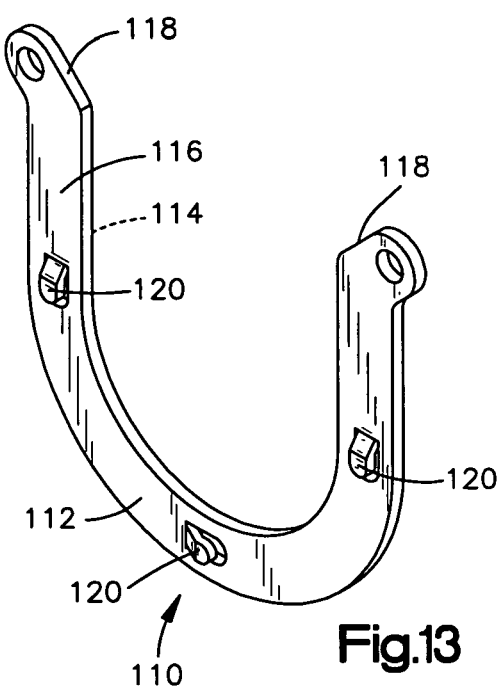
FIG. 13 is a perspective view of the brush/spring assembly of FIG. 12.

FIGS. 12 and 13 illustrate an alternative one-piece brush/spring or brush 110. The brush 110 is formed as one piece from an electrically conductive material, such as metal. The brush 110 has an overall U-shaped configuration when viewed in plan as in FIG. 12.

The brush 110 has a generally flat main body portion 112 having inner and outer major side surfaces 114 and 116. The main body portion 112 of the brush 110 has two ends 118 with fastener openings for securing the brush to the insert 14. The brush 110 is assembled in the weld head 10 so that the inner major side surface 114 of the brush is in abutting engagement with the rotor 30. The brush 110 when assembled in the weld head 10 is at the same electric potential as the insert 14.

The brush 110 further includes one or more spring fingers 120. The spring fingers 120 are resilient members that are formed as one piece with the main body portion 112 of the brush 110. The spring fingers 120 are tabs that are bent outward from the main body portion 112 of the brush 110 to form L-shaped projections on the outer side surface 116 of the brush, as shown. In the illustrated embodiment, three spring fingers 120 are provided. Forming the spring fingers 120 as part of the brush 110 simplifies manufacturing. It also simplifies assembly, because separate small springs can be difficult to handle and assemble.

The brush 110 is usable in the weld head 10 of FIG. 1 in place of the brush 70. When the brush 110 is assembled in the weld head 10, the main body portion 112 of the brush is in contact with the rotor 30. The spring fingers 120 of the brush 110 are in contact with the first cover 28. The brush 110 helps to position the rotor 30 axially as described above, urges it into contact with the insert 14, and also provides a flow path for electricity to the rotor.

Figure 14:
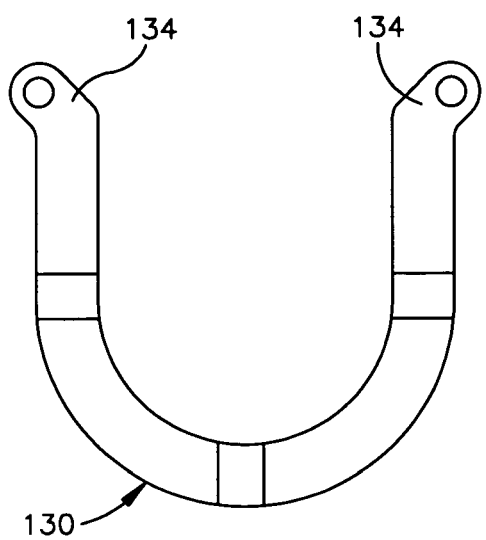
FIG. 14 is a plan view of a brush/spring assembly in accordance with a fifth embodiment of the invention.
Figure 15:
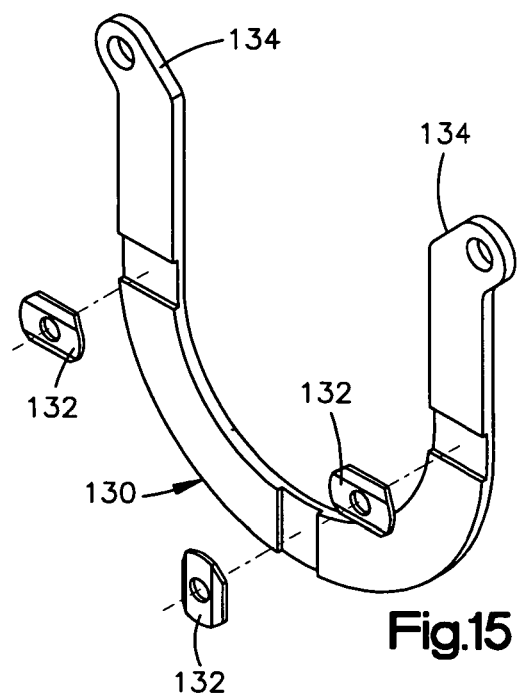
FIG. 15 is a perspective view of the brush/spring assembly of FIG. 14.

FIGS. 14 and 15 illustrate an alternative brush/spring design including a brush 130 and a plurality of separate springs 132. The brush 130 is formed as one piece from an electrically conductive material, such as metal. The brush 130 has an overall U-shaped configuration when viewed in plan as in FIG. 12. The brush 130 has two ends 134 with fastener openings for securing the brush to the insert 14. The brush 130 is assembled in the weld head 10 so that it is in abutting engagement with the rotor 30. The brush 130 when assembled in the weld head 10 is at the same electric potential as the insert 14.

In the illustrated embodiment of FIGS. 14 and 15, three brush springs 132 are provided. The brush springs 132 are disposed between the brush 130 and the first cover 28. The brush springs 132 are resilient members that act between the first cover 28 and the brush 130 to urge the brush away from the first cover. The brush 130 is urged into engagement with the rotor 30, and transmits the force of the brush springs 132 into the rotor.

The force of the brush springs 132 tends to urge the rotor 30 into firm engagement with the insert 14. Specifically, this force tends to urge the rotor track 60 into firm engagement with the insert boss 50. As a result, physical contact is maintained between the rotor 30 and the insert 14, thus minimizing the possibility of arcing within the weld head 10.

As discussed above with reference to FIGS. 1-9, expansion of the rotor without having to provide too much initial clearance between the rotor and the insert 14, is obtained with the track and boss configuration shown in the first embodiment. Alternative embodiments are possible. The particular configuration that is selected for a given weld head is chosen on the basis of predicted expansion. FIGS. 16-19 illustrate a few of the many possible alternative configurations for the insert boss and the rotor track.

Figure 16:
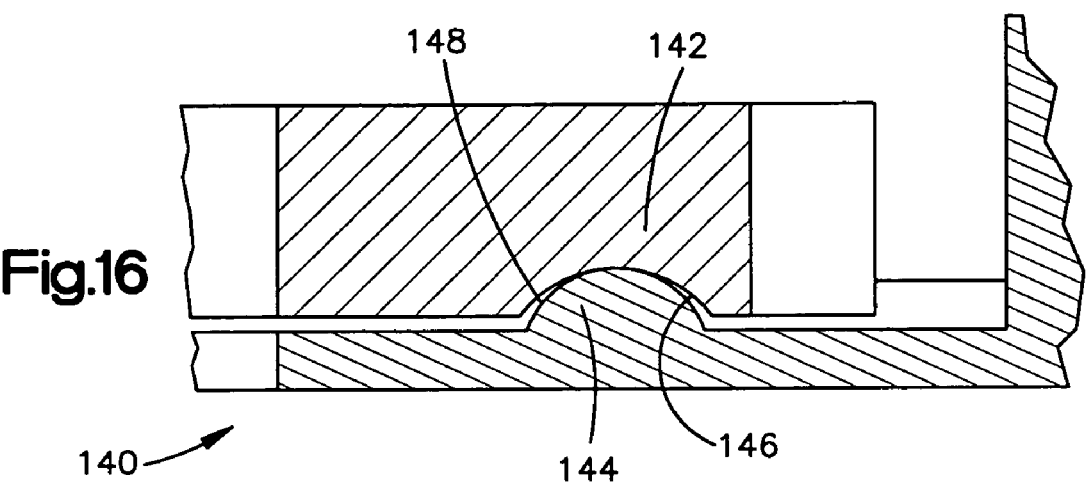
FIG. 16 is an enlarged sectional view similar to FIG. 5 of a portion of a weld head in accordance with a sixth embodiment of the invention.

An example of this is shown in FIG. 16, which illustrates a weld head 140 that includes a track 142 and a boss 144 each having a round (arcuate or otherwise curved) profile. The track 142 has a curved surface 146 that abuttingly engages a curved outer surface 148 on the boss 144. The radii of curvature of the two curved surfaces 146 and 148 are different, to minimize binding and to allow the rotor to move axially on the insert when the rotor expands laterally because of heat.

Figure 17:
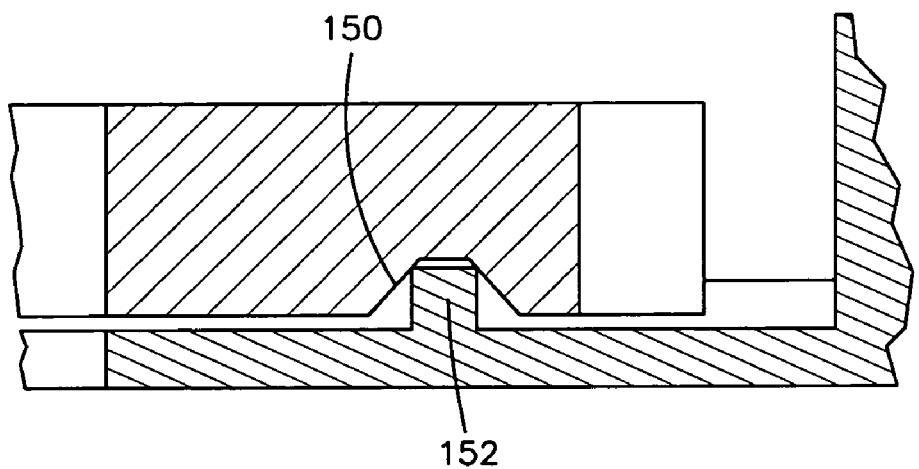
FIG. 17 is an enlarged sectional view similar to FIG. 5 of a portion of a weld head in accordance with a seventh embodiment of the invention.
Figure 18:
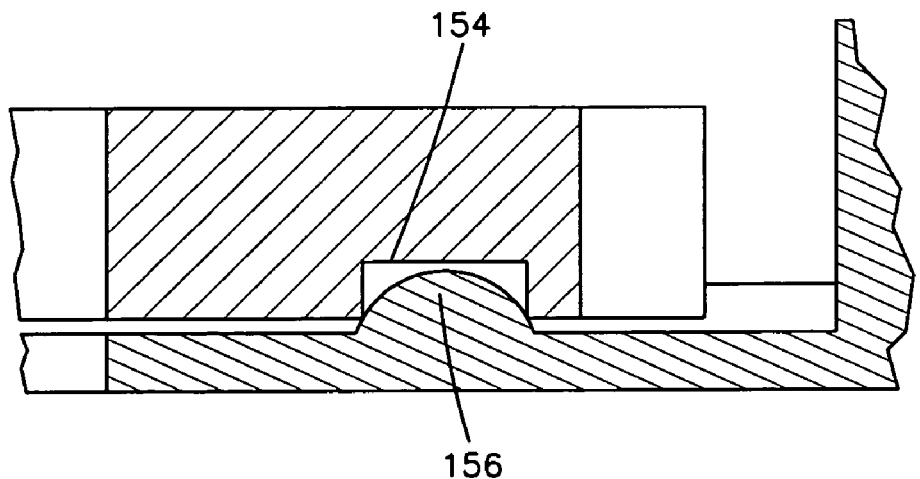
FIG. 18 is an enlarged sectional view similar to FIG. 5 of a portion of a weld head in accordance with a eighth embodiment of the invention.

The two surfaces that engage each other (the track surface on the rotor and the boss surface on the insert) could be non-mating surfaces. That is, the track configuration need not be the same as the configuration of the boss. (In the first embodiment above, the trapezoidal or triangular configuration of the track is identical or similar to, and so mates with, the configuration of the boss.) An example of this would be the combination of a trapezoidal track 150 with a rectangular boss 152, as shown in FIG. 17; or the combination of a rectangular track 154 with a circular boss 156, as seen in FIG. 18. Other possible profiles include curves that vary continuously, such as parabolic or hyperbolic profiles or an involute.

Figure 19:
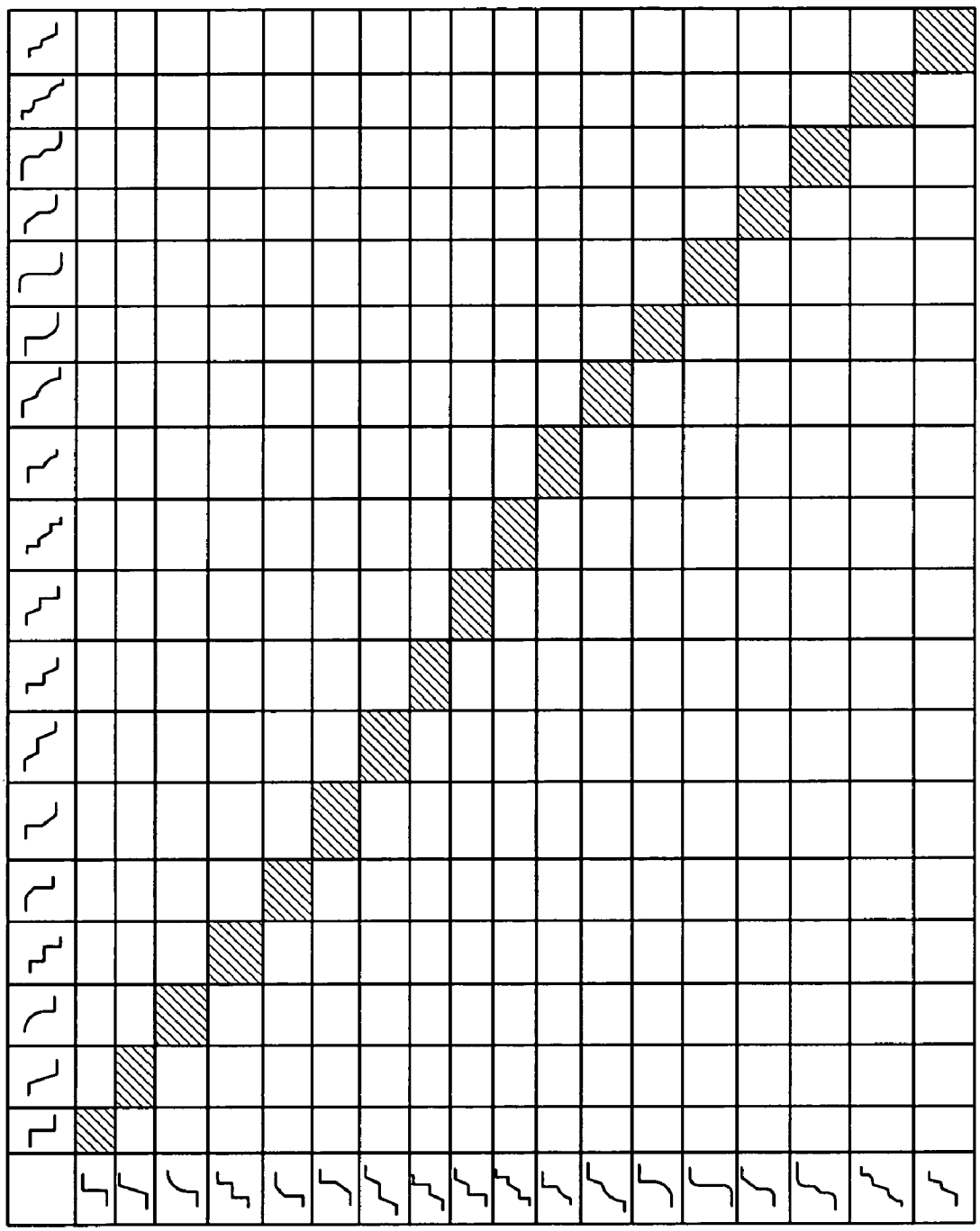
FIG. 19 is a matrix that illustrates other potential combinations of tracks and bosses.

Other potential combinations of tracks and bosses are seen in FIG. 19, which is a matrix illustrating some of the infinite number of possible profiles and combinations of profiles. The left column shows possible configurations for the inner side surface of the boss or of the track, and the top shows possible configurations for the outer side surface of the boss or of the track. A preferred profile combination is generally one that produces surface contact rather than line contact, that produces a reasonable amount of axial movement as a result of radial movement.

The present invention is applicable to air cooled orbital weld heads, to water cooled orbital weld heads, and to orbital weld heads that use other forced cooling techniques. Other variations are possible. For example, the track could be formed on a member other than the one illustrated, i.e., other than the insert. Such changes and modifications are intended to be covered by the attached claims.

Having described the invention, we claim:

1. An orbital welding apparatus having a workpiece opening for receiving a workpiece to be welded, said apparatus comprising:
   a member having a boss; and
   a rotor rotatable on said member about an axis, said rotor carrying an electrode for rotation around the workpiece opening to weld a workpiece therein;
   said rotor having a track comprising a groove having first and second axially extending sides, said boss of said member being received between said first and second sides.

2. An apparatus as set forth in claim 1 wherein the configuration of said rotor and said boss produces axial displacement of said rotor in response to radial expansion of said rotor.

3. An apparatus as set forth in claim 1 wherein said boss and said track engage along interengaging surfaces, said interengaging surfaces extending at an angle transverse to said axis and transverse to said first direction of radial movement of said rotor.

4. An apparatus as set forth in claim 1 wherein said boss and said track engage along interengaging surfaces, said interengaging surfaces extending at an angle of approximately forty five degrees relative to said axis.

5. An apparatus as set forth in claim 3 wherein the amount of axial movement of said rotor is determined as a function of the angle at which said interengaging surfaces extend.

6. An apparatus as set forth in claim 1 wherein at least one of said boss and said track has a trapezoidal configuration.

7. An apparatus as set forth in claim 1 wherein both said boss and said track have a trapezoidal configuration.

8. An apparatus as set forth in claim 1 wherein said boss and said track each have an arcuate configuration.

9. An apparatus as set forth in claim 1 further comprising a metal spring/brush that exerts a side load on said rotor, said spring/brush being formed as one piece.

10. An apparatus as set forth in claim 9 wherein said member and said rotor are made from metal and are at the same electric potential as said metal spring/brush.

11. An apparatus as set forth in claim 1 further comprising a metal spring/brush that exerts a side load on said rotor, said spring/brush being formed as a plurality of pieces.

12. An apparatus as set forth in claim 1 further comprising a mica laminate cover for covering said rotor.

13. An apparatus as set forth in claim 12 further comprising a metal spring/brush that exerts a side load on said rotor, said spring/brush acting between said mica laminate cover and said rotor.

14. An apparatus as set forth in claim 12 wherein said mica laminate material comprises an alumino-silicate composition including at least one of potassium and magnesium.

15. An apparatus as set forth in claim 12 wherein said mica laminate material is rated at a continuous use temperature in the range of from about 900° F. to about 1300° F.

16. An apparatus as set forth in claim 12 further comprising a second cover on an opposite side of said member, said second cover being made from a mica laminate material.

17. An orbital welding apparatus having a workpiece opening for receiving a workpiece to be welded, said apparatus comprising:
a member;
a rotor supported on said member for rotation relative to said member about an axis, said rotor carrying an electrode rotatable around the workpiece opening to weld a workpiece therein;
said rotor upon heating being expandable in a first direction radially away from said axis;
radial expansion of said rotor in the first direction producing axial movement of said rotor in a direction away from said member, wherein the member and the rotor engage each other along corresponding interengaging surfaces, with at least one of the member and rotor interengaging surfaces forming a straight line in radial cross-section, such that axial movement of said rotor is linear with respect to the radial expansion of said rotor.

18. An apparatus as set forth in claim 17 wherein said interengaging surfaces of both said member and said rotor form a straight line of engagement in cross section.

19. An apparatus as set forth in claim 17 wherein said interengaging surfaces comprise a boss on one of said rotor and said member, and a corresponding track on the other of said rotor and said member.

20. An apparatus as set forth in claim 17 wherein the amount of axial movement of said rotor is determined as a function of an angle at which said interengaging surfaces are disposed.

21. An apparatus as set forth in claim 17 further comprising a metal spring/brush that exerts a side load on said rotor, said spring/brush being formed as one piece.

22. An apparatus as set forth in claim 21 wherein said member and said rotor are made from metal and are at the same electric potential as said metal spring/brush.

23. An apparatus as set forth in claim 17 further comprising a cover for covering said rotor.

24. An apparatus as set forth in claim 23 further comprising a metal spring/brush that exerts a side load on said rotor against said member, said spring/brush being at the same electric potential as said member, said spring/brush engaging said cover and acting between said cover and said rotor.

25. An apparatus as set forth in claim 23 wherein said cover substantially covers said member and said rotor.

26. An orbital welding apparatus having a workpiece opening for receiving a workpiece to be welded, said apparatus comprising:
a member;
a rotor supported on said member for rotation relative to said member about an axis, said rotor carrying an electrode rotatable around the workpiece opening to weld a workpiece therein;
said rotor upon heating being expandable in a first direction radially away from said axis;
said rotor and said member having interengaging surfaces configured to maintain a straight line of engagement, in radial cross-section, between said rotor and said member in response to axial displacement of said rotor away from said member resulting from radial expansion of said rotor in the first direction with respect to said member.

27. An apparatus as set forth in claim 26 wherein said interengaging surfaces of said rotor and said member extend at an angle transverse to said axis and transverse to said first direction of radial movement of said rotor.

28. An apparatus as set forth in claim 27 wherein the amount of axial movement of said rotor is determined as a function of the angle between said interengaging surfaces of said rotor and said member.

29. An apparatus as set forth in claim 26 wherein said interengaging surfaces of said rotor and said member extend at an angle of approximately forty five degrees relative to said axis.

30. An apparatus as set forth in claim 26 wherein the interengaging surfaces comprise a boss on one of the rotor and the member, and a corresponding track on the other of the rotor and the member.

31. An apparatus as set forth in claim 30 wherein at least one of said boss and said track has a trapezoidal configuration.

32. An apparatus as set forth in claim 26 further comprising a metal spring/brush that exerts a side load on said rotor, said spring/brush being formed as one piece.

33. An apparatus as set forth in claim 32 wherein said member and said rotor are made from metal and are at the same electric potential as said metal spring/brush.

34. An apparatus as set forth in claim 26 further comprising a cover for covering said rotor.

35. An apparatus as set forth in claim 34 further comprising a metal spring/brush that exerts a side load on said rotor against said member, said spring/brush being at the same electric potential as said member, said spring/brush engaging said cover and acting between said cover and said rotor.

36. An apparatus as set forth in claim 26 wherein said member comprises an insert that supports said rotor and one or more gears for driving said rotor, said insert and said gears and said rotor being made from metal.

37. An apparatus as set forth in claim 36 further comprising a spring/brush that loads said rotor axially against said insert, said spring/brush being made from metal.

38. An orbital welding apparatus having a workpiece opening for receiving a workpiece to be welded, said apparatus comprising:
a member;
a rotor supported on said member for rotation relative to said member about an axis, said rotor carrying an electrode rotatable around the workpiece opening to weld a workpiece therein;
said rotor being expandable upon heating in a first direction radially away from said axis;
wherein said rotor and said member have interengaging frustoconical ramp surfaces that cause said rotor to move axially relative to said member in response to radial expansion of said rotor resulting from an increase in the temperature of said rotor.

39. An apparatus as set forth in claim 38 wherein said ramp surfaces are formed on trapezoidal portions of said rotor and said member.

40. An apparatus as set forth in claim 39 wherein said rotor has a trapezoidal track and said member has a trapezoidal boss that fits in said trapezoidal track.

41. An orbital welding apparatus having a workpiece opening for receiving a workpiece to be welded, said apparatus comprising:
a member made from metal;

a metal rotor supported on said member for rotation relative to said member about an axis, said rotor carrying an electrode rotatable around the workpiece opening to weld a workpiece therein, said rotor and said electrode being at the same electric potential as said member; and a spring/brush that exerts a side load on said rotor against said member, said spring/brush being at the same electric potential as said member, wherein the spring/brush comprises a first planar portion, a second planar portion axially spaced from the first planar portion, and a spring portion connecting the first and second planar portions, the spring portion biasing the second planar portion into axial engagement with the rotor.

42. An apparatus as set forth in claim 41 wherein said member comprises an insert that supports said rotor for rotation about the workpiece opening.

43. An apparatus as set forth in claim 41 further comprising a cover for covering said rotor, said spring/brush engaging said cover and acting between said cover and said rotor.

44. An apparatus as set forth in claim 41 wherein said member and said rotor have no designed-in clearance and are configured to accommodate expansion of said rotor without binding on said member.

45. An apparatus as set forth in claim 41 wherein the configuration of said rotor and said member produces axial displacement of said rotor in response to radial expansion of said rotor.

46. An apparatus as set forth in claim 41 wherein said rotor and said member comprise interengaging surfaces extending at an angle transverse to said axis and transverse to the direction of radial expansion of said rotor.

47. An apparatus as set forth in claim 41 wherein said rotor and said member have interengaging trapezoidal portions.

* * * * *

UNITED STATES PATENT AND TRADEMARK OFFICE
CERTIFICATE OF CORRECTION

PATENT NO. : 7,414,220 C1  Page 1 of 1
APPLICATION NO. : 90/009285
DATED : December 29, 2009
INVENTOR(S) : Peter Oyster et al.

It is certified that error appears in the above-identified patent and that said Letters Patent is hereby corrected as shown below:

In the Ex Parte Reexamination Certificate (7281st)

Column 3, claim 62, line 1, "54" should read --57--.

Signed and Sealed this

Twenty-fourth Day of August, 2010

David J. Kappos
*Director of the United States Patent and Trademark Office*

(12) EX PARTE REEXAMINATION CERTIFICATE (7281st)
United States Patent
Oyster et al.

(10) Number: US 7,414,220 C1
(45) Certificate Issued: Dec. 29, 2009

(54) ORBITAL WELD HEAD

(75) Inventors: Peter Oyster, Stow, OH (US); Nathan Ames, Streetsboro, OH (US); Craig Mizer, Stow, OH (US); Tom Horvath, Cleveland Heights, OH (US)

(73) Assignee: Swagelok Company, Solon, OH (US)

Reexamination Request:
No. 90/009,285, Jan. 8, 2009

Reexamination Certificate for:
| Patent No.: | 7,414,220 |
| Issued: | Aug. 19, 2008 |
| Appl. No.: | 10/912,316 |
| Filed: | Aug. 5, 2004 |

Related U.S. Application Data

(60) Provisional application No. 60/481,216, filed on Aug. 12, 2003.

(51) Int. Cl.
| *B23K 9/028* | (2006.01) |
| *B23K 9/32* | (2006.01) |
| *B23K 37/053* | (2006.01) |
| *B23K 9/12* | (2006.01) |

(52) U.S. Cl. .................... 219/60 A; 219/125.11
(58) Field of Classification Search .......... None
See application file for complete search history.

(56) References Cited

U.S. PATENT DOCUMENTS

| 1,388,434 A | 8/1921 | Johnston |
| 4,963,041 A | 10/1990 | Sowards |
| 5,223,686 A | 6/1993 | Benway et al. |
| 5,571,431 A | 11/1996 | Lantieri et al. |
| 5,841,089 A | 11/1998 | Martinenas |
| 6,459,062 B1 | 10/2002 | Guerrina |

OTHER PUBLICATIONS

Arc Machines, "Model–9–500 Illustrated Parts Breakdown Manual", Arc Machines, Inc., Mar. 2002.
Arc Machines, "Model 9–250 Illustrated Parts Breakdown". Arc Machines, Inc., Nov. 1995.
M.K. Products "Orbital Weldhead Owner's Manual & Maintenance Manual", Sep. 1993, pp. 23–24, M.K. Products, Inc., U.S.
Cogebi, "Mica plates for high–performance thermal and electrical insulation", Mar. 2001, Inc., U.S.

*Primary Examiner*—Aaron J. Lewis

(57) ABSTRACT

An orbital weld head includes a metal insert and rotor. The covers are made from mica laminate. A metal spring/brush that is preferably one piece side loads the rotor against the insert. The rotor and insert have interengaging portions, preferably trapezoidal, that cause the rotor to move axially when it expands from heat, thus minimizing binding.

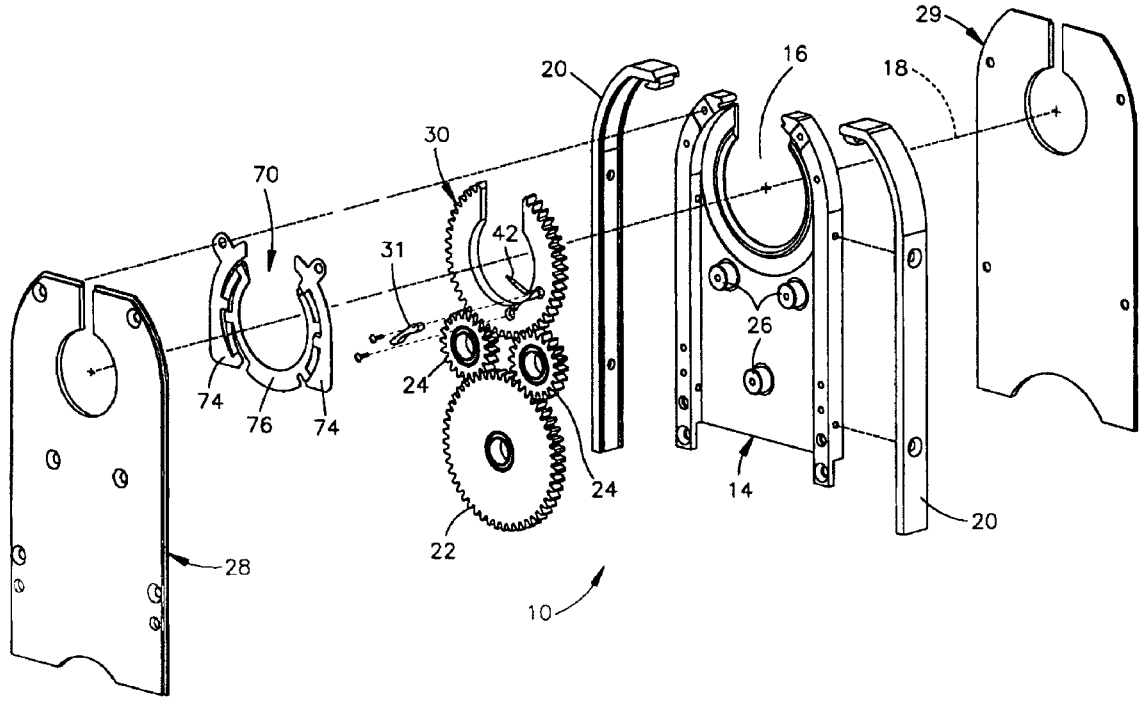

US 7,414,220 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 17–21, 23–25, 26–35, 38–40 and 41–47 is confirmed.

Claims 2 and 5 are cancelled.

Claims 1, 8, 10, 22 and 36 are determined to be patentable as amended.

Claims 3, 4, 6, 7, 9, 11–16 and 37, dependent on an amended claim, are determined to be patentable.

New claims 48–65 are added and determined to be patentable.

1. An orbital welding apparatus having a workpiece opening for receiving a workpiece to be welded, said apparatus comprising: a member having a boss; and a rotor rotatable on said member about an axis, said rotor carrying an electrode for rotation around the workpiece opening to weld a workpiece therein; said rotor having a track comprising a groove having first and second axially extending sides, said boss of said member being received between said first and second sides; *wherein the rotor is free to move axially in response to radial thermal expansion of the rotor; and further wherein the boss and track have interengaging surfaces that cause axial movement of the rotor in response to radial expansion of the rotor, the apparatus permitting sufficient axial movement of the rotor to prevent binding between the boss and the groove.*

8. An apparatus as set forth in claim 1 wherein *one of* said boss and said track [each have] *has* an arcuate configuration.

10. [An apparatus as set forth in claim 9] *An orbital welding apparatus having a workpiece opening for receiving a workpiece to be welded, said apparatus comprising: a member having a boss; a rotor rotatable on said member about an axis, said rotor carrying an electrode for rotation around the workpiece opening to weld a workpiece therein; said rotor having a track comprising a groove having first and second axially extending sides, said boss of said member being received between said first and second sides; and*

*a metal spring/brush that exerts a side load on said rotor;*
*wherein said member and said rotor are made from metal and are at the same electric potential as said metal spring/brush.*

22. [An apparatus as set forth in claim 21] *An orbital welding apparatus having a workpiece opening for receiving a workpiece to be welded, said apparatus comprising: a member; a rotor supported on said member for rotation relative to said member about an axis, said rotor carrying an electrode rotatable around the workpiece opening to weld a workpiece therein; said rotor upon heating being expandable in a first direction radially away from said axis; radial expansion of said rotor in the first direction producing axial movement of said rotor in a direction away from said member, wherein the member and the rotor engage each other along corresponding interengaging surfaces, with at least one of the member and rotor interengaging surfaces forming a straight line in radial cross-section, such that axial movement of said rotor is linear with respect to the radial expansion of said rotor; and*

*a metal spring/brush that exerts a side load on said rotor;*
*wherein said member and said rotor are made from metal and are at the same electric potential as said metal spring/brush.*

36. [An apparatus as set forth in claim 26] *An orbital welding apparatus having a workpiece opening for receiving a workpiece to be welded, said apparatus comprising: a member; a rotor supported on said member for rotation relative to said member about an axis, said rotor carrying an electrode rotatable around the workpiece opening to weld a workpiece therein; said rotor upon heating being expandable in a first direction radially away from said axis; said rotor and said member having interengaging surfaces configured to maintain a straight line of engagement, in radial cross-section, between said rotor and said member in response to axial displacement of said rotor away from said member resulting from radial expansion of said rotor in the first direction with respect to said member;*

*wherein said member member comprises an insert that supports said rotor and one or more gears for driving said rotor, said inert and said gears and said rotor being made from metal.*

48. *An apparatus as set forth in claim 1, wherein at least one of the first and second sides of the groove rides on a corresponding one of the first and second sides of the boss at any axial position of the rotor.*

49. *An apparatus as set forth in claim 1, wherein the boss and the groove comprise metal, wherein the axial movement of the rotor in response to radial expansion of the rotor prevents binding of the metal boss against the metal groove.*

50. *An apparatus as set forth in claim 1, further comprising a cover and a spring/brush disposed between the rotor and the cover, the spring/brush exerting a side load on the rotor to urge the boss into engagement with the track, wherein the spring/brush axially separates the rotor from the cover.*

51. *An apparatus as set forth in claim 1, further comprising a cover, wherein the member comprises a metal insert axially disposed between the rotor and the cover.*

52. *An apparatus as set forth in claim 1, wherein the boss includes first and second sides, and further wherein at least one of the sides of at least one of the boss and the groove includes a straight obliquely extending surface disposed at an angle selected to produce a desired axial movement in repsonse to radial thermal expansion of the rotor.*

53. *An apparatus as set forth in claim 1, wherein the apparatus prevents binding between the boss and the groove due to predicted cumulative thermal expansion of the rotor resulting from repeated use of the apparatus.*

54. *An apparatus as set forth in claim 17, wherein the apparatus permits sufficient axial movement of the rotor to prevent binding between the boss and the groove due to predicted cumulative thermal expansion of the rotor resulting from repeated use of the apparatus.*

55. *An apparatus as set forth in claim 26, wherein the apparatus permits sufficient axial movement of the rotor to* prevent binding between the boss and the groove due to predicted cumulative thermal expansion of the rotor resulting from repeated use of the apparatus.

56. An apparatus as set forth in claim 38, wherein the apparatus permits sufficient axial movement of the rotor to prevent binding between the boss and the groove due to predicted cumulative thermal expansion of the rotor resulting from repeated use of the apparatus.

57. An orbital welding apparatus having a workpiece opening for receiving a workpiece to be welded, said apparatus comprising: a member having a boss; and a rotor rotatable on said member about an axis, said rotor carrying an electrode for rotation around the workpiece opening to weld a workpiece therein; said rotor having a track comprising a groove having first and second axially extending sides, said boss of said member being received between said first and second sides; wherein the boss and groove are sized such that there is no radial clearance between the boss and the first and second sides of the grooves when the member and rotor are in an unexpanded condition.

58. An apparatus as set forth in claim 57, wherein the boss and the groove comprise metal.

59. An apparatus as set forth in claim 57, wherein the boss comprises a material that is stable at a temperature of at least 600° F.

60. An apparatus as set forth in claim 59, wherein the material of the boss comprises at least one of stainless steel, copper, and bronze.

61. An apparatus as set forth in claim 57, wherein the boss comprises a material having a melting temperature of at least 700° F.

62. An apparatus as set forth in claim 54, wherein the boss comprises a material that is stable for use in supporting the rotor at a temperature of at least 500° F.

63. An apparatus as set forth in claim 57, wherein one of the first and second sides of the groove includes an engaging surface oriented to provide axial movement of the rotor in response to radial thermal expansion of the rotor, the apparatus permitting sufficient axial movement to prevent binding between the boss and the groove due to predicted cumulative thermal expansion of the rotor resulting from repeated use of the apparatus.

64. An apparatus as set forth in claim 57, wherein radial thermal expansion of the rotor produces axial movement of the rotor resulting from at least one of the first and second sides of the groove riding on the boss.

65. An orbital welding apparatus having a workpiece opening for receiving a workpiece to be welded, said apparatus comprising: a member having a boss; and a rotor rotatable on said member about an axis, said rotor carrying an electrode for rotation around the workpiece opening to weld a workpiece therein; said rotor having a track comprising a groove having first and second axially extending sides, said boss of said member being recieved between said first and second sides; wherein one of the first and second sides of the groove includes an engaging surface that causes axial movement of the rotor in response to radial thermal expansion of the rotor, the apparatus permitting sufficient axial movement of the rotor to prevent binding between the boss and the groove due to predicted cumulative thermal expansion of the rotor resulting from repeated use of the apparatus.

* * * * *